US012674489B2

(12) United States Patent
Arnault et al.

(10) Patent No.: US 12,674,489 B2
(45) Date of Patent: Jul. 7, 2026

(54) BEARING DEVICE WITH INTEGRATED ELECTRICAL INSULATION, IN PARTICULAR FOR ELECTRIC MOTOR OR ELECTRIC MACHINE

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR); Anthony Simonin, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 4 days.

(21) Appl. No.: 19/049,218

(22) Filed: Feb. 10, 2025

(65) Prior Publication Data

US 2025/0271035 A1     Aug. 28, 2025

(30) Foreign Application Priority Data

Feb. 22, 2024     (FR) ...................................... 2401743

(51) Int. Cl.
*F16C 19/52*          (2006.01)
*F16C 19/06*          (2006.01)
(Continued)

(52) U.S. Cl.
CPC .............. *F16C 33/62* (2013.01); *F16C 19/06* (2013.01); *F16C 19/52* (2013.01); *F16C 33/586* (2013.01);
(Continued)

(58) Field of Classification Search
CPC ........ F16C 19/06; F16C 19/52; F16C 33/586; F16C 33/62; F16C 33/64; F16C 35/077;
(Continued)

(56) References Cited

U.S. PATENT DOCUMENTS 6,482,140 B1     11/2002  Takatsu
6,715,925 B2 *    4/2004  Pairone ................... D06F 37/00
                                                            384/537

(Continued)

FOREIGN PATENT DOCUMENTS

DE      102008016928 A1 *  10/2008   ............ F16C 37/007
JP          2007002946 A       1/2007
JP          2009210090 A       9/2009

OTHER PUBLICATIONS

Preliminary Search Report from the French Patent Office dated Sep. 27, 2024 in related French application No. FR2401743, including Search Report and Written Opinion.

*Primary Examiner* — Phillip A Johnson
(74) *Attorney, Agent, or Firm* — J-TEK LAW PLLC; Scott T. Wakeman; Mark A. Ussai

(57)          ABSTRACT

A bearing device includes a first ring and a second ring configured to rotate relative to one another and an insulating sleeve formed from a bushing and an electrically insulating lining. The lining is overmolded on the bushing and on the second ring and connects the bushing to the second ring. The radial internal or external surface of the bushing incudes at least one helicoidal groove and the lining incudes at least one fastening rib having a shape complementary to a shape of the at least one helicoidal groove that extends into the at least one helicoidal groove. The helicoidal groove extends circumferentially at least 360 degrees around the radial internal or external surface of the bushing or the radial internal surface of the bushing.

12 Claims, 7 Drawing Sheets

(51) Int. Cl.
    *F16C 33/58*       (2006.01)
    *F16C 33/62*       (2006.01)
    *F16C 33/64*       (2006.01)
    *F16C 35/077*      (2006.01)

(52) U.S. Cl.
    CPC ............ *F16C 33/64* (2013.01); *F16C 35/077*
           (2013.01); *F16C 2220/04* (2013.01); *F16C*
        *2220/06* (2013.01); *F16C 2226/60* (2013.01);
          *F16C 2226/70* (2013.01); *F16C 2380/26*
                              (2013.01)

(58) Field of Classification Search
    CPC .............. F16C 2220/04; F16C 2220/06; F16C
              2226/60; F16C 2226/70; F16C 2380/26
    See application file for complete search history.

(56)                   References Cited

U.S. PATENT DOCUMENTS

| | | | |
|---|---|---|---|
| 11,002,315 B2 * | 5/2021 | Stephan | F16C 33/60 |
| 12,104,650 B2 | 10/2024 | Arnault et al. | |
| 12,173,754 B2 | 12/2024 | Arnault et al. | |
| 12,196,263 B2 | 1/2025 | Arnault et al. | |
| 2020/0047795 A1 | 2/2020 | Falossi et al. | |
| 2023/0122158 A1 | 4/2023 | Zhong et al. | |
| 2023/0220874 A1 | 7/2023 | Arnault et al. | |
| 2023/0223813 A1 | 7/2023 | Arnault et al. | |
| 2024/0026926 A1 | 1/2024 | Chollet | |

\* cited by examiner

BEARING DEVICE WITH INTEGRATED ELECTRICAL INSULATION, IN PARTICULAR FOR ELECTRIC MOTOR OR ELECTRIC MACHINE

CROSS-REFERENCE

This application claims priority to French patent application no. 2401743 filed on Feb. 22, 2024, the contents of which are fully incorporated herein by reference.

TECHNOLOGICAL FIELD

The present disclosure is directed to the field of insulated bearings which are used, in particular, in electric motors, electric machines and associated equipment.

BACKGROUND

In an electric motor or an electric machine, at least one rolling bearing is mounted between the housing of the electric motor or the electric machine and the rotating shaft in order to support this shaft.

During operation when the shaft is in rotation, a difference in electrical potential can be occur between the shaft and the housing of the electric motor or the electric machine, which generates an electric current between the internal ring of the rolling bearing which is fixed to the shaft and the external ring which is fixed to the housing.

The electric current passing through the components of the rolling bearing can damage these components, in particular the rolling elements and the raceways formed on the internal and external rings. The electrical discharges can also generate vibrations.

In order to remedy these drawbacks, it is known to replace the rolling elements of the bearing, which are produced from the same steel as that of the internal and external rings, by rolling elements which are manufactured from ceramic. Generally this is referred to as a hybrid rolling bearing.

However, such a hybrid rolling bearing is relatively costly.

In order to remedy the aforementioned drawbacks, it is also known to provide the external ring of the rolling bearing with an insulating sleeve which is provided with a bushing and an insulating lining which is produced from electrically insulating material and which is radially interposed between the external ring and the bushing.

In order to implement the fixing of the insulating lining to the external ring and to the bushing without an additional element or specific machining on the external ring, it is possible to overmold the insulating lining. However, with such a solution, the insulating lining and the bushing can become detached during operation.

The present disclosure thus aims to remedy the aforementioned drawbacks by proposing a bearing device of simple and economical design.

SUMMARY

The disclosure relates to a bearing device comprising a bearing which is provided with a first ring and a second ring which are configured to rotate relative to one another.

The device also comprises at least one insulating sleeve which is mounted on the second ring of the bearing. The insulating sleeve is provided with a bushing and an insulating lining which is interposed radially between the second ring of the bearing and the bushing. The insulating lining is produced from electrically insulating material. The bushing comprises an external surface and an internal surface, opposing the external surface, which delimit the radial thickness of the bushing. The insulating lining is overmolded on the second ring of the bearing and at least on one of the external and internal surfaces of the bushing.

According to a general feature, the surface of the bushing is provided with at least one helicoidal groove, a fastening rib of the insulating lining of a complementary shape to the helicoidal groove extending therein.

According to a further general feature, the helicoidal groove extends circumferentially over at least one complete revolution around the axis of the surface of the bushing. In other words, the helicoidal groove extends over at least 360° in the circumferential direction. This provides a bearing device with integral electrical insulation which is economical relative to conventional hybrid rolling bearings. Moreover, the device is simple to manufacture and to assemble in the associated electric motor or electric machine.

Moreover, the provision of the helicoidal groove on the bushing makes it possible to obtain an effective fixing to the insulating lining, to the extent that the fastening rib is formed inside the insulating lining during the overmolding. The risk of relative displacements between the insulating lining and the bushing in the axial and circumferential directions is particularly limited, in particular in the event of temperature variations. This is made possible by the provision of the helicoidal groove on the bushing which extends over at least one complete revolution when considering the axis of the helix.

The "axial direction" is understood to mean the direction which is parallel to the axis of the bearing device. The "circumferential direction" is understood to mean the direction which is perpendicular both to the axial direction and to a radius of the bearing device, in other words tangent to a circle, the center thereof being on the axis of the bearing device.

Advantageously, the helicoidal groove of the bushing can extend circumferentially over at least two complete revolutions around the axis of revolution of the surface of the bushing, i.e. over at least 720°, and in order to form at least two turns which are spaced apart in the axial direction.

In one embodiment, the helicoidal groove can have a circular arc shape in cross section. In a further embodiment, the helicoidal groove can be delimited in the axial direction by two opposing lateral flanks which have a rectilinear profile in axial section. This makes it possible to enhance further the fastening of the insulating lining to the bushing.

According to a first design, the helicoidal groove of the bushing is delimited in the radial direction by a base, the flanks extending therefrom so as to protrude toward the outside. In other words, each lateral flank forms a slope break relative to the base in its connecting zone with the base.

The "radial direction" is understood to mean the direction along a radius of the bearing device, i.e. any direction intersecting the axis of the bearing device and perpendicular to this axis.

The lateral flanks extend so as to protrude toward the outside relative to the base at least in the radial direction. The lateral flanks can extend so as to protrude relative to the base in a purely radial direction. This further improves the fastening of the insulating lining to the bushing. As a variant, however, it is possible to provide that the lateral flanks extend so as to protrude obliquely relative to the base, i.e. both in the radial direction and also in the axial direction.

According to a second design, the helicoidal groove of the bushing can have no base. In this case, the lateral flanks of the groove are connected together and extend obliquely.

Irrespective of the design of the helicoidal groove with or without a base, when the lateral flanks extend obliquely, these flanks, when viewed in axial section, can be symmetrical when considering a radial plane, or asymmetrical.

The bushing can be provided with two front faces delimiting the axial length thereof.

According to a first design, the helicoidal groove extends from one of the front faces in the direction of the other front face. The helicoidal groove can lead into the other front face or remain axially at a distance therefrom.

According to a second design, the helicoidal groove can remain at a distance from the two front faces of the bushing. In other words, in this case the helicoidal groove does not lead into the front faces of the bushing.

In one embodiment, the pitch of the helicoidal groove is constant. Alternatively, the pitch of the helicoidal groove can be variable.

Preferably, the helicoidal groove extends in the radial thickness of the bushing by being blind.

In one particular embodiment, the surface of the bushing is provided with at least one additional helicoidal groove, a fastening rib of the insulating lining of complementary shape extending therein, and the additional helicoidal groove extending in an axial direction opposing the direction of the helicoidal groove. This also makes it possible to enhance the fixing relative to the insulating lining and the bushing. The additional helicoidal groove can extend circumferentially over at least one complete revolution around the axis of the surface of the bushing, or as a variant over at least one complete revolution.

If the insulating lining is produced from a synthetic material or from elastomer material it enables the device to be rendered insensitive to temperature variations. In one particular embodiment, the bushing is produced from metallic material. The bushing can thus be easily machined to a predetermined radial tolerance. In one embodiment, the insulating lining covers the entire surface of the bushing. In this case, the insulating lining covers the surface of the bushing entirely in the axial direction and in the circumferential direction.

According to a first design, the bushing delimits the external surface of the device. In this case, the second ring is the external ring of the bearing. According to a second alternative design, the bushing delimits the internal surface of the device. In this case, the second ring is the internal ring of the bearing.

In one particular embodiment, the bearing comprises at least one row of rolling elements which are arranged between the raceways of the first and second rings. The rolling elements can be produced from metallic material.

The invention further relates to an electric motor comprising a housing, a shaft and at least one bearing device as defined above and mounted radially between the housing and the shaft.

BRIEF DESCRIPTION OF THE DRAWINGS

The present invention will be understood more clearly by studying the detailed description of embodiments provided by way of non-limiting examples illustrated by the accompanying drawings, in which.

DETAILED DESCRIPTION

Figure 1:
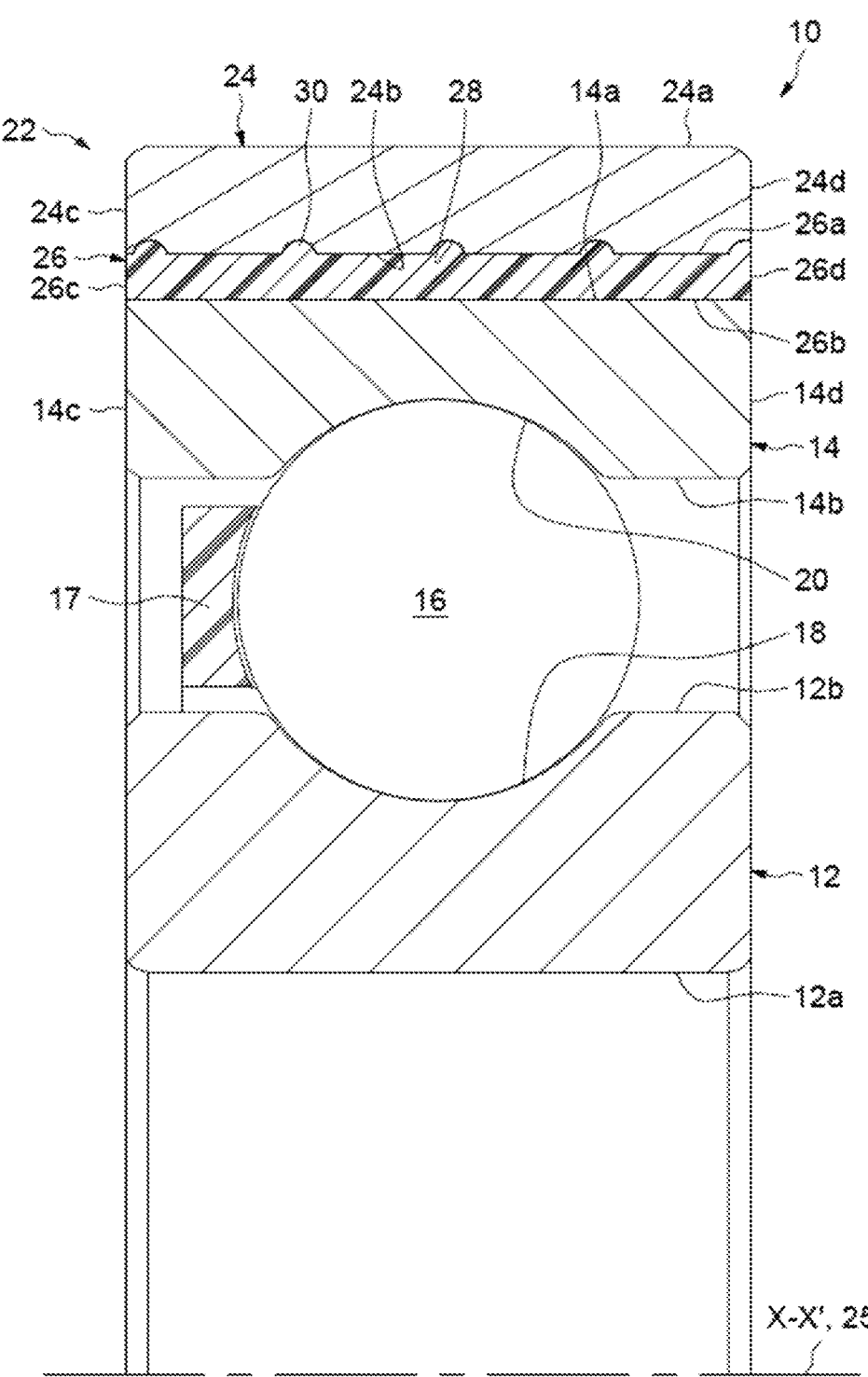
FIG. 1 is a partial view in axial section of a bearing device according to an exemplary embodiment of the disclosure.

The bearing device illustrated in FIG. 1 comprises a bearing 10 provided with a first ring 12 and a second ring 14 which are configured to rotate relative to one another around the axis X-X' of the bearing. In the illustrated exemplary embodiment, the first ring 12 is the internal ring of the bearing and the second ring 14 is the external ring.

As will be described in more detail below, the bearing device is designed so as not to conduct electric currents. The bearing device has integrated electrical insulation.

The internal 12 and external 14 rings of the bearing are concentric and extend axially along the axis X-X' of the bearing. The internal 12 and external 14 rings are produced from steel. The rings are of the solid type.

In the illustrated exemplary embodiment the bearing 10 also comprises a row of rolling elements 16, in this case balls, interposed radially between the internal 12 and external 14 rings. The rolling elements 16 are produced from steel. The bearing 10 also comprises a cage 17 for maintaining the uniform circumferential spacing of the rollers 16. The bearing 10 can also be provided with sealing gaskets or sealing flanges.

The internal ring 12 comprises a cylindrical bore 12a, a cylindrical axial external surface 12b radially opposing the bore, and two radially opposing front faces (not referenced) axially delimiting the bore and the external surface. The bore 12a and the external surface 12b delimit the radial thickness of the internal ring 12. The bore 12a forms the internal surface of the internal ring. The internal ring 12 further comprises an internal raceway 18 for the rolling elements 16 which is formed on the external surface 12b. The raceway 18 is radially oriented toward the outside.

The external ring 14 comprises a cylindrical axial external surface 14a, a cylindrical bore 14b radially opposing the external surface 14a and two opposing radial front faces 14c, 14d axially delimiting the bore and the external surface. The external surface 14a and the bore 14b delimit the radial thickness of the external ring 14. The external ring 14 further comprises an external raceway 20 for the rolling elements 16 which is formed on the bore 14b. The raceway 20 is oriented radially toward the inside.

The bearing device also comprises an electrical insulating sleeve 22 which is mounted on the external ring 14. The insulating sleeve 22 is mounted on the external surface 14a of the external ring 14. The insulating sleeve 22 is fixed to the external ring 14. The insulating sleeve 22 comprises a bushing 24 and an insulating lining 26 interposed radially between the external ring 14 and the bushing 24. The insulating lining 26 is overmolded on the external ring 14 and on the bushing 24.

The bushing 24 is of annular shape. The bushing 24 extends axially. The bushing 24 is produced in this case in one piece. The bushing 24 comprises a cylindrical axial external surface 24a and a cylindrical bore 24b which radially opposes the external surface 24a, the axis 25 thereof being coaxial with the axis X-X'. The bore 24b forms the internal surface of the bushing 24.

The bushing 24 also comprises two radially opposing front faces 24c, 24d axially delimiting the bore and the external surface. The front faces 24c, 24d delimit the axial length of the bushing. The external surface 24a and the bore 24b delimit the radial thickness of the bushing 24. The external surface 24a of the bushing delimits the external surface of the bearing device 10. In other words, the external surface 24a defines the external diameter of the bearing device 10.

Figure 2:
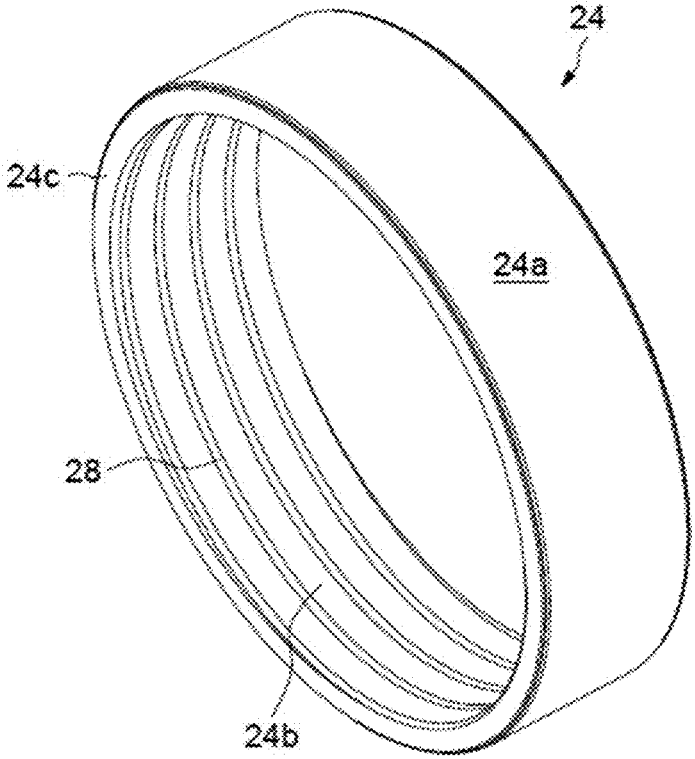
FIG. 2 is a perspective view of a bushing of the bearing device of FIG. 1.
Figure 3:
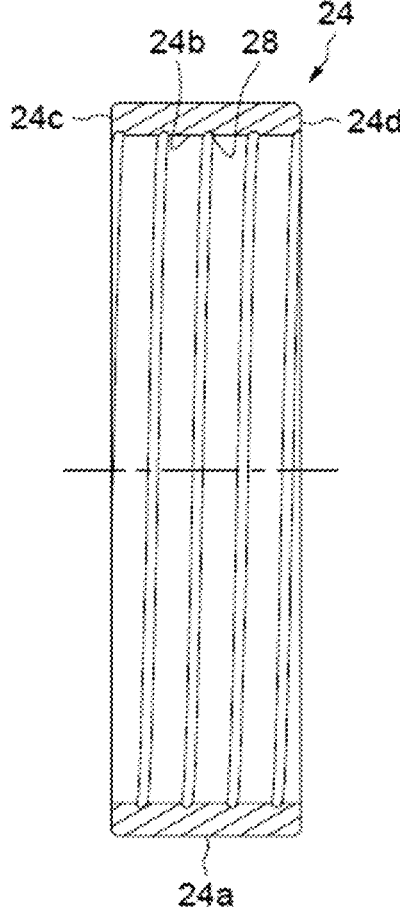
FIG. 3 is a sectional view of the bushing of FIG. 2.

As can be seen in FIGS. 1 to 3, the bore 24b of the bushing is provided with a helicoidal groove 28 which extends along the bore. The groove 28 extends around and along the axis 25 of the bore of the bushing. The helicoidal groove 28 extends in this case from the front face 24c and leads into the front face 24d. The groove 28 forms a succession of turns which are spaced apart relative to one another in the axial direction. The turns of the groove 28 are not contiguous. In other words, two successive turns of the groove 28 are separated from one another by the bore 24b of the bushing.

The helicoidal groove 28 extends in this case circumferentially over four complete revolutions around the axis 25 of the bore of the bushing. As a variant, it is possible to provide a different number of revolutions, but still preserving at least one complete revolution.

The helicoidal groove 28 has in this case in cross section a circular arc shape oriented toward the interior. Alternatively, it is possible to provide other shapes, by a groove being delimited in the axial direction by two opposing lateral flanks which have a rectilinear profile in axial section.

As a variant, it could also be possible to provide on the external surface 14a of the external ring a helicoidal groove of the same type as that provided on the bore 24b of the bushing.

The bushing 24 is advantageously produced from metallic material. Thus, if required, the external surface 24a of the bushing can be easily machined to a predetermined tolerance. Preferably, the bushing 24 is produced from steel. The bushing 24 can be obtained from a sheet metal blank by cutting, pressing and rolling. Alternatively, the bushing 24 can be obtained from a tube or from forged and rolled blanks, or even from sintering and stamping. The helicoidal groove 28 can be formed, for example, by removing material, for example by machining, or even by embossing material.

The insulating lining 26 is produced from electrically insulating material. The insulating lining 26 can be produced, for example, from synthetic material, such as a PEEK or a PA46, or even produced from elastomer material, for example from rubber.

The insulating lining 26 is radially interposed between the external surface 14a of the external ring and the bore 24b of the bushing. The insulating lining 26 covers the external surface 14a of the external ring. In this case, the insulating lining 26 entirely covers the external surface 14a when considering the axial and circumferential directions. The insulating lining 26 also covers the bore 24b of the bushing. In this case, the insulating lining 26 also entirely covers the bore 24b when considering the axial and circumferential directions.

As indicated above, the insulating lining 26 is overmolded on the external ring 14 of the bearing and on the bushing 24.

The insulating lining 26 is overmolded on the external surface 14a of the external ring 14 and on the bore 24b of the bushing 24.

The insulating lining 26 is of annular shape. The insulating lining 26 extends axially. The insulating lining 26 comprises a cylindrical axial external surface 26a, a cylindrical bore 26b radially opposing the external surface 26a, and two radially opposing front faces 26c, 26d axially delimiting the bore and the external surface. The front faces 26c, 26d axially delimit the insulating lining 26. The external surface 26a and the bore 26b delimit the radial thickness of the insulating lining 26. The external surface 26a is in radial contact with the bore 24b of the bushing. The bore 26b is in radial contact with the external surface 14a of the external ring.

In the illustrated exemplary embodiment, the faces 14c, 26c, 24c and 14d, 26d, 24d of the external ring, the insulating lining and the bushing are respectively coplanar.

Alternatively, it is possible to provide further arrangements. For example, the insulating lining 26 could have a reduced axial dimension and remain axially set back from the faces 14c, 14d of the external ring. Alternatively, the insulating lining 26 could have a greater axial dimension and extend so as to protrude axially from the faces 14c, 14d of the external ring. In this case, the insulating lining 26 can at least partially cover these faces 14c, 14d. As a variant, the insulating lining 26 could at least partially cover the faces 24c, 24d of the bushing.

In a further alternative or in combination, the bushing 24 could extend so as to protrude axially from the insulating lining 26 relative to the faces 26c and 26d, or remain axially set back from these faces.

The insulating lining 26 also comprises a rib 30 extending radially toward the outside from the external surface 26a and housed inside the groove 28 of the bushing. The rib 30 is of a complementary shape to the groove 28. The rib 30 thus has a helicoidal shape along the external surface 26a of the insulating lining. The rib 30 extends around and along the axis of the external surface 26a of the insulating lining which is coaxial to the axis X-X'. The rib 30 extends so as to protrude relative to the external surface 26a of the insulating lining. The rib 30 is formed on the external surface 26a during the overmolding of the insulating lining 26.

In order to manufacture the bearing device, the invention proceeds in the following manner.

In a first step, the bearing 10 and the bushing 24 provided with the helicoidal groove 28 are mounted inside a mold which is provided for the overmolding of the insulating lining 26. In this position mounted inside the mold, the bushing 24 is radially at a distance from the external ring 14 of the bearing.

Then, during a second successive step, the insulating lining 26 is overmolded both on the external ring 14 of the bearing and on the bushing 24. As indicated above, the rib 30 of the insulating lining which promotes the fastening to the bushing 24 is formed during this step.

Finally, the bearing device which is in the form of a single assembly, is removed from the mold.

Figure 4:
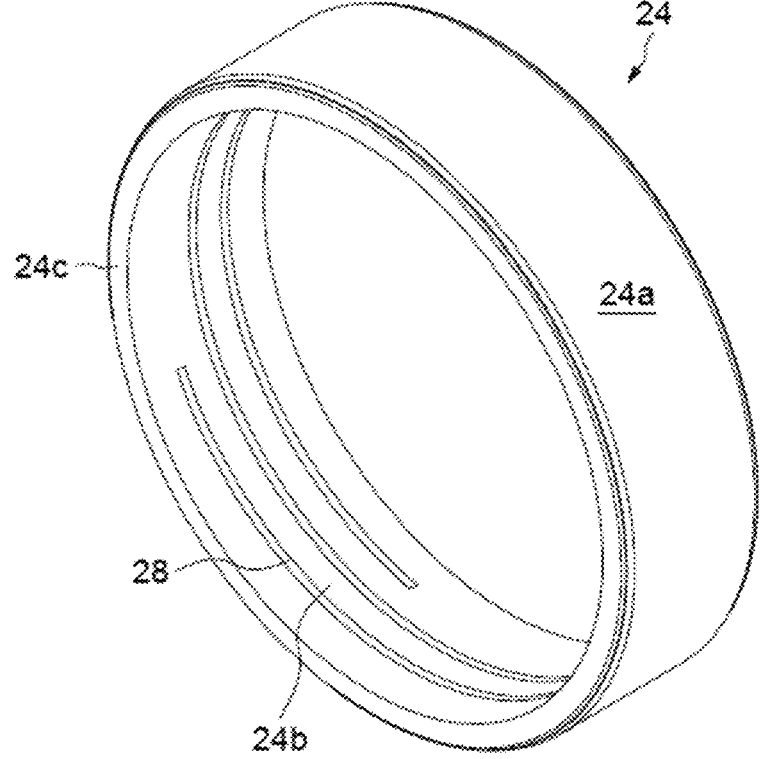
FIG. 4 is a perspective view of a bushing of a bearing device according to a further exemplary embodiment of the invention.
Figure 5:
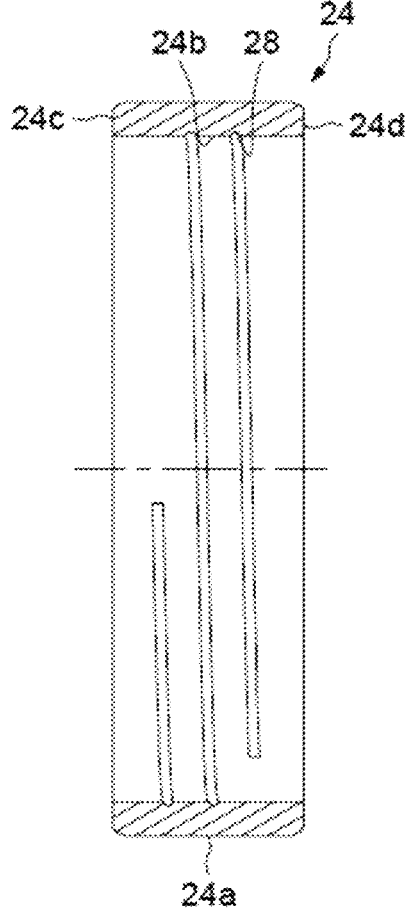
FIG. 5 is a sectional view of the bushing of FIG. 4.

As indicated above, in this exemplary embodiment, the helicoidal groove 28 of the bushing extends from the front face 24c and leads into the front face 24d. Alternatively, it is possible to provide further arrangements. For example, as illustrated in FIGS. 4 and 5, the groove 28 can remain at a distance from the front faces 24c, 24d of the bushing by being centered in the bore or alternatively by being decentered.

7

Figure 6:
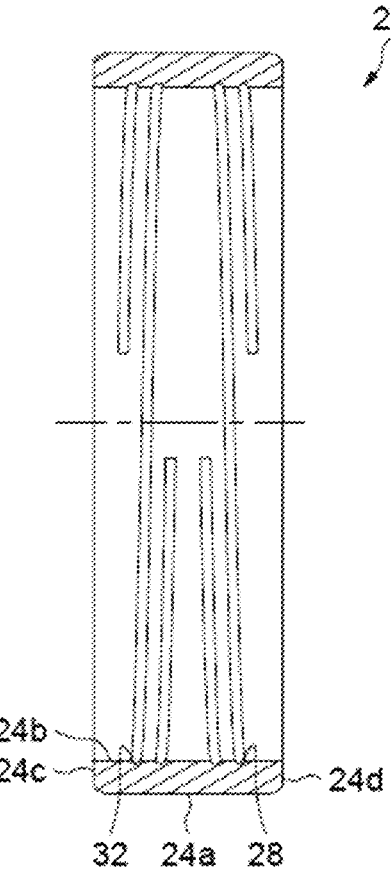
FIG. 6 is a sectional view of a bushing of a bearing device according to a further exemplary embodiment of the invention.

In the exemplary embodiment illustrated in FIG. 6, the bore 24*b* of the bushing is also provided with a second helicoidal groove 32 which extends along the bore in an axial direction opposing that of the first helicoidal groove 28. Starting from the median radial plane of the bushing 24, the helicoidal groove 32 extends in the direction of the front face 24*c* and the groove 28 extends in the direction of the front face 24*d*.

In this exemplary embodiment, the proximal ends of the grooves 28 and 32, i.e. the ends which are located axially to the side of the median radial plane of the bushing 24, are axially spaced apart from one another and located axially on either side of the plane. Alternatively, these proximal ends of the grooves 28, 32 could be located on the same side of the plane.

Figure 7:
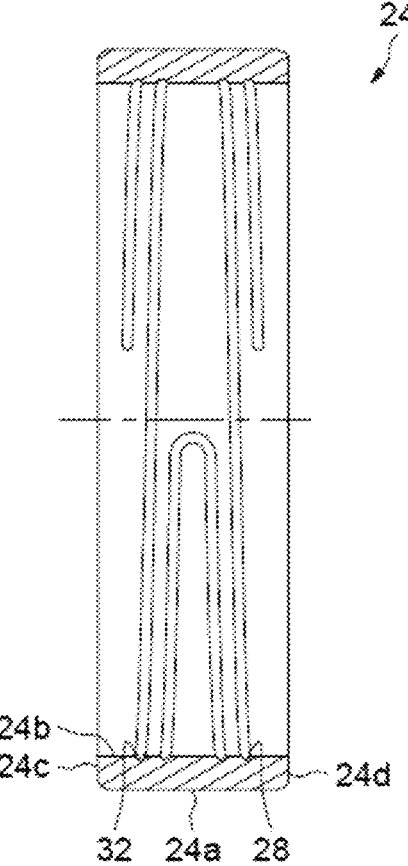
FIG. 7 is a sectional view of a bushing of a bearing device according to a further exemplary embodiment of the invention.

In the exemplary embodiment illustrated in FIG. 7, the proximal ends of the helicoidal grooves 28, 32 are contiguous and located in the median radial plane of the bushing 24. Alternatively, the proximal ends of the grooves 28, 32 could also be located on the same side of the plane.

In the exemplary embodiments illustrated in FIGS. 7 and 8, the grooves 28, 32 are symmetrical relative to the median radial plane of the bushing 24. Alternatively, the groove 32 could be different from the groove 28 and have a different pitch and/or helix angle and/or length.

In the illustrated exemplary embodiments, the first ring 12 of the bearing is the internal ring and the second ring 14, on which the insulating lining 26 is overmolded, is the external ring.

Alternatively, it is possible to provide a reverse arrangement in which the second ring 14, on which the insulating lining 26 is overmolded, is the internal ring. In this case, the insulating sleeve is located in the bore 12*a* of the internal ring. The insulating lining is thus interposed radially between the bore 12*a* of the internal ring and the external surface of the bushing. The insulating lining is overmolded on the internal ring and at least on the external surface of the bushing. The external surface of the bushing is provided with the helicoidal groove. The bore of the bushing delimits the bore of the bearing device In the described exemplary embodiments, the bearing of the device is provided with a single row of rolling elements. As a variant, the bearing can be provided with a plurality of rows of rolling elements. Moreover, the rolling bearing can comprise different types of rolling elements from balls, for example rollers. In a further variant, the bearing can be a sliding bearing which is not provided with rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:
   a first ring and a second ring configured to rotate relative to one another, and
   an insulating sleeve comprising a bushing and an electrically insulating lining,
   wherein the electrically insulating lining is overmolded on the bushing and on the second ring and connects the bushing to the second ring,
   wherein the bushing includes a radially external surface and a radially internal surface and a radial thickness from the external surface to the internal surface,
   wherein the radial external surface of the bushing or the radial internal surface of the bushing incudes at least one helicoidal groove,
   wherein the electrically insulating lining incudes at least one fastening rib having a shape complementary to a shape of the at least one helicoidal groove and extending into the at least one helicoidal groove, and
   wherein the at least one helicoidal groove extends circumferentially at least 360 degrees around the radial external surface of the bushing or the radial internal surface of the bushing.

2. The bearing device according to claim 1,
   wherein the at least one helicoidal groove extends circumferentially at least 720 degrees around the radial external surface of the bushing or the radial internal surface of the bushing and forms at least two turns which are spaced apart in an axial direction.

3. The bearing device according to claim 2,
   wherein the bushing comprises a first axial face and a second axial face delimiting an axial length of the bushing, and
   wherein the at least one helicoidal groove has a first end in the first axial face and a second end in the second axial face.

4. The bearing device according to claim 2,
   wherein the bushing comprises a first axial face and a second axial face delimiting an axial length of the bushing, and
   wherein the at least one helicoidal groove has a first end axially spaced from the first axial face and a second end axially spaced from the second axial face.

5. The bearing device according to claim 1,
   wherein the bushing comprises a first axial face and a second axial face delimiting an axial length of the bushing, and
   wherein the at least one helicoidal groove has a first end in the first axial face and a second end in the second axial face.

6. The bearing device according to claim 1,
   wherein the bushing comprises a first axial face and a second axial face delimiting an axial length of the bushing, and

wherein the at least one helicoidal groove has a first end
   axially spaced from the first axial face and a second end
   axially spaced from the second axial face.

7. The bearing device according to claim 1, wherein the at least one helicoidal groove is axially
   delimited by two opposing lateral flanks having a
   rectangular profile in axial section.

8. The bearing device according to claim 1, wherein a pitch of the at least one helicoidal groove is
   constant.

9. The bearing device according to claim 1, wherein a pitch of the at least one helicoidal groove is
   variable.

10. The bearing device according to any claim 1, wherein the at least one helicoidal groove comprises a
   first helicoidal groove and a second helicoidal groove, wherein the at least one fastening rib comprises a first
   fastening rib and a second fastening rib, and wherein a pitch of the first helicoidal groove is opposite
   to a pitch of the second helicoidal groove.

11. The bearing device according to claim 1, wherein the bushing is metallic.

12. An electric motor comprising:

a housing, a shaft, and at least one bearing device according to claim 1 mounted
   radially between the housing and the shaft.

\*   \*   \*   \*   \*